Feb. 23, 1960 C. L. CAMPBELL 2,925,884
LINE PURIFIER CONSTRUCTION
Filed July 13, 1956
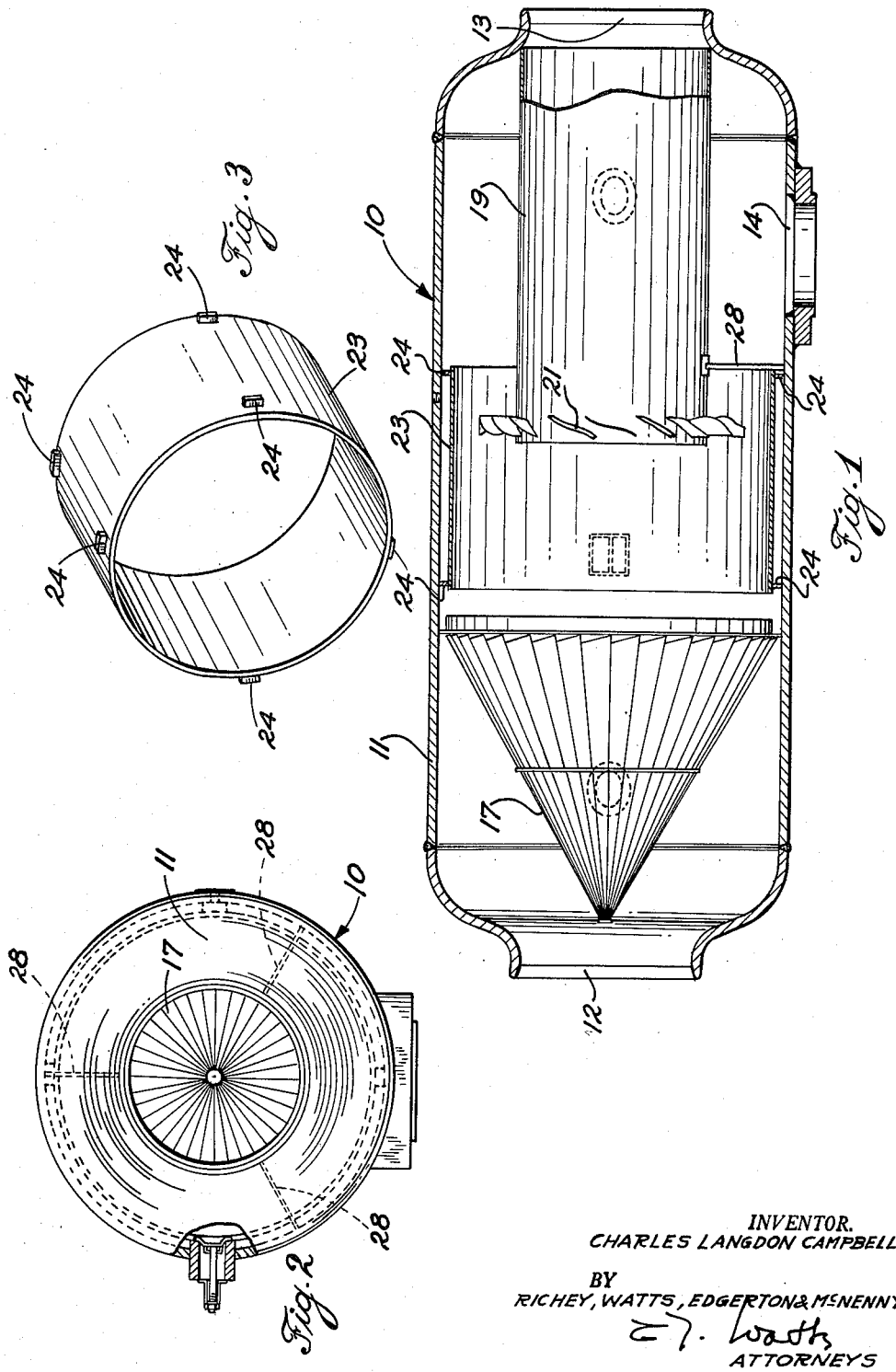
INVENTOR.
CHARLES LANGDON CAMPBELL
BY
RICHEY, WATTS, EDGERTON & McNENNY
ATTORNEYS

United States Patent Office 2,925,884
Patented Feb. 23, 1960

2,925,884

LINE PURIFIER CONSTRUCTION

Charles Langdon Campbell, Cleveland, Ohio, assignor to Centrifix Corporation, Cleveland, Ohio, a corporation of Ohio Application July 13, 1956, Serial No. 597,664

2 Claims. (Cl. 183—80)

The present invention relates generally to centrifugal separators and is more particularly concerned with a novel line purifier for centrifugally separating entrained solids and liquids from gases.

It is a principal object of the present invention to provide a line purifier which will have superior separating characteristics.

It is a further important object of this invention to provide a line purifier which can be operated continuously without re-entrainment of separated solids and liquids in gases passing through the purifier.

It is a further primary object of this invention to provide a line purifier which can be used advantageously with a wide variety of gas, liquid and solid mixtures such as steam with heavy water entrainments, natural gas in transport with heavy liquid or solid entrainments.

Still another object of this invention is to secure all the foregoing new results and advantages without incurring any substantial offsetting disadvantage.

Those skilled in the art will gain a further and better understanding of this invention from the detailed descriptions set out below, reference being had to the drawings accompanying and forming a part of the specification, in which:

Fig. 1 is a longitudinal sectional view of a line purifier embodying this invention in a preferred form;

Fig. 2 is an end elevational view taken at the inlet end of the Fig. 1 device; and, Fig. 3 is a perspective view of the novel shield element of this invention.

In general, apparatus of the present invention comprises the combination in a line purifier of shield means to prevent re-entrainment in gases traveling through the purifier of solids and liquids which have been separated from the gases by the action of the tuyere element. This shield means comprises a baffle plate fixed in position within the shell of the purifier and spaced from the inside surface of the shell, and having a portion extending forwardly of the nozzle element of the purifier to a location adjacent of the outer periphery of the discharge end of the tuyere.

More specifically and with reference to the drawings, a line purifier 10 of this invention comprises a generally cylindrical, fabricated metal shell 11 having an inlet opening 12, an outlet opening 13 in axial alignment with the inlet opening, these openings being of reduced diameter and located at the two ends of shell 11. A drain opening 14, also of reduced size, is located in the lower part of the shell near discharge opening 13.

A generally conical louvered tuyere 17 is disposed in shell 11 adjacent to inlet opening 12 and is anchored in position against the inside surface of the shell. Tuyere 17 is disposed with its apex adjacent to inlet opening 12 so as to impart strong whirling forces to gas mixtures delivered into the shell through the inlet opening. The base rim of the tuyere, as will be apparent in the drawings, approaches the maximum inside diameter of the shell 11 so that the radius of the annular space between the rim and the shell is relatively short.

Extending inwardly from the other end of shell 11 is a generally cylindrical nozzle 19 approximately one-half as long as the shell. The down-stream end of nozzle 19 bears against an annular inner surface of the shell around outlet opening 13, being of slightly greater inside diameter than said outlet. Adjacent to its inner end the nozzle is provided with a plurality of blades 21 which are mounted on the other side of the nozzle and extend radially outwardly therefrom at regular, short intervals around the circumference of the nozzle. Blades 21 are, however, relatively short radially and do not approach closely the inner surface of the shell of the purifier.

A generally cylindrical shield or baffle plate 23 is disposed within the shell down-stream from tuyere 17 but adjacent thereto and is supported in place by means of two sets of four relatively short lugs 24 which bear against the inner surface of the shell. The diameter of shield 23 approaches the maximum inside diameter of shell 11 so that the radius of the annular space between the shield and the shell is relatively short. It is intended that the heavier portions of the gas mixture be caught between the shield 23 and shell 11 and therefore the radially short annular spacing of the tuyere base rim and the shield with respect to the shell will be substantially equal. Shield 23, however, is of substantial axial length so that the shield receives the inner end of nozzle 19 in telescoping relation, thus preventing re-entrainment of separated particles or droplets in gases entering the inlet end of nozzle 19 for discharge from the purifier. The down-stream end of shield 23 does not extend, however, to drain opening 14, but as shown in Fig. 1, is disposed approximately midway between the drain opening and the inlet end of the nozzle. The shield is suitably secured in position in the shell by means of welds joining lugs 24 to the vessel and also by three radially disposed support members 28 (one shown). Supports 28 are disposed approximately 120° apart and are secured to nozzle 19 and to the inner of shell 11 to prevent displacement of inner end of the nozzle and also to prevent dislodgement of shield 23.

It will be understood by those skilled in the art that in operation the device of this invention is free from the difficulties and shortcomings of the prior art devices of this general class, particularly in respect to the tendency toward re-entrainment of centrifugally-separated substances in the gases undergoing purification. Thus it will be seen that gases containing entrained solids and for liquids will be purified by the present device through centrifugal action, the purified gases moving from the tuyere through shield 23 and into nozzle 19, while the heavier non-gaseous components are collected on the inner surface of shell 11 and conducted out of contact with the purified gases to drain opening 14 for separate discharge from the purifier vessel.

Shield 23 is located in such manner with respect to nozzle 19 and tuyere 17 that the separation of liquid and solid materials from the gases to be purified is not in any way impaired by comparison with the prior art devices; and, at the same time, any tendency toward re-entrainment of these materials is for all practical purposes eliminated. Separated non-gaseous materials carried or flowing along the upper portion of the inside walls of shell 11 from tuyere 17 to a point down-stream from the inlet end of nozzle 19 normally tend to fall back into the gas stream approaching and entering the nozzle. In accordance with the present invention, however, such fall-off cannot re-enter the purified gas stream because it is intercepted by shield 23 and conducted thereby to a point well below the inlet end of nozzle 19. Incidently, lugs

What is claimed is:

1. A line purifier for centrifugally separating entrained solids and liquids from gases comprising a generally cylindrical shell to be disposed in use with its axis substantially horizontal and having axial inlet and outlet openings in its ends and continuous side walls from end to end and a radially disposed drain opening in its lower side portion between said inlet and outlet openings, a generally conical tuyere in the shell between the shell inlet opening and drain opening and anchored against the inside surface of the shell to impart whirling forces to gas mixtures entering the shell through the shell inlet opening, said tuyere having a base rim approaching the maximum inside diameter of the shell and providing with the shell a radially short annular space for flow of the whirling gas mixture past the tuyere into the shell, a nozzle coaxial of the shell and extending from the shell outlet opening to a point between the tuyere and the drain opening, and shield means to prevent re-entrainment in gases traveling through the line purifier of solids and liquids separated from said gases by action of the tuyere, the shield means comprising an open-ended cylinder having an outside diameter approaching the maximum inside diameter of the shell and providing with the shell a radially short annular space for flow of separated solids and liquids in the direction of the drain opening, said short annular spacing of the tuyere base rim and the cylinder being substantially equal, and said cylinder having an inlet end portion disposed adjacent to the tuyere and being telescopically positioned with respect to said nozzle over a portion of the length thereof and providing an open and unobstructed passageway for gas traveling from the tuyere to the nozzle, said shield having its outlet end disposed between the inlet end of the nozzle and the shell drain opening.

2. A line purifier for centrifugally separating entrained solids and liquids from gases comprising a generally cylindrical shell to be disposed in use with its axis substantially horizontal and having axial inlet and outlet openings in its ends and continuous side walls from end to end and a radially disposed drain opening in its lower side portion between said inlet and outlet openings, a generally conical tuyere in the shell between the shell inlet opening and drain opening and anchored against the inside surface of the shell to impart whirling forces to gas mixtures entering the shell through the shell inlet opening, the apex of the tuyere being disposed adjacent to the shell inlet opening and the base of the tuyere approaching the maximum inside diameter of the shell and providing with the shell a radially short annular space for flow of the whirling gas mixture past the tuyere into the shell, a nozzle coaxial of the shell and extending from the shell outlet opening to a point between the tuyere and the drain opening and having an inside diameter slightly larger than the inside diameter of the shell outlet opening and provided with a plurality of blades projecting outwardly around the inlet end of the nozzle, and shield means to prevent re-entrainment in gases traveling through the line purifier of solids and liquids separated from said gases by action of the tuyere, the shield means comprising an open-ended cylinder telescopically arranged and radially spaced from the nozzle and having an outside diameter approaching the maximum inside diameter of the shell and providing with the shell a radially short annular space for flow of separated solids and liquids in the direction of the drain opening, said short annular spacing of the tuyere base and the cylinder being substantially equal, and said cylinder having an inlet end portion disposed adjacent to the tuyere and providing an open and unobstructed passageway for gas traveling from the tuyere to the nozzle, said shield having its outlet end disposed between the inlet end of the nozzle and the shell drain opening, and said shield further being provided with a plurality of lugs disposed at spaced intervals around its outside surface to bear against the inside surface of the shell and locate and secure the shield cylinder in spaced relation to the shell.

References Cited in the file of this patent

UNITED STATES PATENTS

| | | |
|---|---|---|
| 791,517 | Walker | June 6, 1905 |
| 1,215,935 | Hickman | Feb. 13, 1917 |
| 1,724,041 | Plaisted | Aug. 13, 1929 |
| 2,059,521 | Hawley | Nov. 3, 1936 |
| 2,557,332 | Wright | June 19, 1951 |
| 2,565,902 | Wright et al. | Aug. 28, 1951 |
| 2,580,317 | Pekar et al. | Dec. 25, 1951 |
| 2,732,032 | Sandison | Jan. 24, 1956 |

FOREIGN PATENTS

| | | |
|---|---|---|
| 479,714 | Italy | Apr. 10, 1953 |